US011768465B2

(12) United States Patent
Dubois et al.

(10) Patent No.: US 11,768,465 B2
(45) Date of Patent: Sep. 26, 2023

(54) TIMEPIECE COMPONENT BASED ON PHOTOSTRUCTURABLE GLASS

(71) Applicant: Nivarox-FAR S.A., Le Locle (CH)

(72) Inventors: Philippe Dubois, Marin (CH); Thierry Hessler, St-Aubin (CH); Christian Charbon, Chézard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 133 days.

(21) Appl. No.: 16/773,473

(22) Filed: Jan. 27, 2020

(65) Prior Publication Data
US 2020/0159168 A1 May 21, 2020

Related U.S. Application Data

(62) Division of application No. 14/729,270, filed on Jun. 3, 2015, now abandoned.

(30) Foreign Application Priority Data

Jun. 3, 2014 (EP) .................................. 14171008

(51) Int. Cl.
| G04B 13/00 | (2006.01) |
| C03C 27/06 | (2006.01) |
| C03C 15/00 | (2006.01) |
| G04B 1/14 | (2006.01) |
| G04B 31/004 | (2006.01) |
| G04D 3/00 | (2006.01) |

(52) U.S. Cl.
CPC .............. *G04B 13/00* (2013.01); *C03C 15/00* (2013.01); *C03C 27/06* (2013.01); *G04B 1/145* (2013.01); *G04B 31/004* (2013.01); *G04D 3/00* (2013.01)

(58) Field of Classification Search
CPC ...... G04B 17/04; G04B 17/045; G04B 13/02; G04B 1/00; G04B 31/004; G04B 1/145; G04B 13/00; G04C 3/102; G04D 3/00
See application file for complete search history.

(56) References Cited

U.S. PATENT DOCUMENTS

| 4,362,397 A * | 12/1982 | Klingenberg .......... G04B 45/04 968/145 |
| 6,573,156 B1 | 6/2003 | Wang et al. |
| 6,670,212 B2 | 12/2003 | McNie et al. |

(Continued)

FOREIGN PATENT DOCUMENTS

| EP | 1 436 830 A1 | 7/2004 |
| EP | 1 791 039 A1 | 5/2007 |

(Continued)

OTHER PUBLICATIONS

European Search Report issued in corresponding application No. 14171008, completed on Feb. 23, 2015.

(Continued)

*Primary Examiner* — Sean Kayes
(74) *Attorney, Agent, or Firm* — Oblon, McClelland, Maier & Neustadt, L.L.P.

(57) ABSTRACT

A substrate for forming timepiece components includes a first part based on photostructurable glass and at least a second part based on at least one second material. One surface of the first part is made integral with a surface of the second part so as to form a one-piece timepiece component.

21 Claims, 4 Drawing Sheets

(56) References Cited

U.S. PATENT DOCUMENTS

| | | |
|---|---|---|
| 6,710,540 B1 | 3/2004 | Albert et al. |
| 6,955,975 B2 | 10/2005 | Reichenbach et al. |
| 7,618,183 B2 | 11/2009 | Meister et al. |
| 7,753,581 B2 | 7/2010 | Hessler et al. |
| 8,354,032 B2 | 1/2013 | Dinger et al. |
| 8,486,279 B2 | 7/2013 | Fiaccabrino et al. |
| 2002/0017132 A1 | 2/2002 | McNie et al. |
| 2008/0008051 A1* | 1/2008 | Marmy ............... G04B 15/14 368/170 |
| 2008/0198702 A1* | 8/2008 | Meister ............... B81C 99/008 368/232 |
| 2009/0016173 A1 | 1/2009 | Hessler et al. |
| 2010/0005659 A1 | 1/2010 | Dinger et al. |
| 2010/0243603 A1 | 9/2010 | Fiaccabrino et al. |
| 2013/0135974 A1 | 5/2013 | Niedermann et al. |
| 2013/0279307 A1 | 10/2013 | Fiaccabrino et al. |
| 2014/0313866 A1* | 10/2014 | Hessler ............... H03H 9/2468 368/202 |
| 2015/0138932 A1 | 5/2015 | Oes et al. |
| 2015/0309476 A1* | 10/2015 | Rhul ............... G04B 17/227 29/896.31 |
| 2016/0133486 A1 | 5/2016 | Andry et al. |

FOREIGN PATENT DOCUMENTS

| | | |
|---|---|---|
| EP | 2 060 534 A1 | 5/2009 |
| EP | 2 145 857 A1 | 1/2010 |
| WO | 03/032377 A1 | 4/2003 |

OTHER PUBLICATIONS

Becker, H., et al. "Chemical analysis in photostructurable glass chips," Sensors and Actuators 6 86 (2002) 271-279.

* cited by examiner

TIMEPIECE COMPONENT BASED ON PHOTOSTRUCTURABLE GLASS

CROSS-REFERENCE TO RELATED APPLICATIONS

This application is a divisional of U.S. patent application Ser. No. 14/729,270, filed on Jun. 3, 2015, and claims priority from European Patent Application No. 14171008.7 filed on Jun. 3, 2014. The benefit of priority is claimed to each of the foregoing, and the entire contents of each of the foregoing are incorporated herein by reference.

FIELD OF THE INVENTION

The invention relates to a timepiece component based on photostructurable glass and particularly a component of this type including at least one photostructurable glass based part and at least one other silicon, metal or ceramic based part.

BACKGROUND OF THE INVENTION

In the field of horology, an increasing number of timepiece components are formed with the aid of fragile materials such as those based on silicon or ceramic. For example, it is possible to envisage forming the balance spring, balance or pallets.

However, techniques for etching these fragile materials limit possibilities as regards the possible shapes of components.

SUMMARY OF THE INVENTION

It is an object of the present invention to overcome all or part of the aforecited drawbacks by proposing a timepiece component which is less limited in regard to shape yet still retains the possibility of using parts based on silicon or ceramic.

To this end, the invention relates to a timepiece component including a first part based on photostructurable glass, at least a second part based on at least a second material, characterized in that one surface of the first part is made integral with a surface of the second part so as to form a one-piece timepiece component.

Advantageously according to the invention, it is understood that the timepiece component is of the composite type, i.e. it is formed of photostructurable glass and of at least one other material. It is therefore understood that particular shapes can be obtained with the photostructurable glass part while retaining a functional silicon, metal or ceramic based element.

In accordance with other advantageous variants of the invention:

said at least one second material is silicon-based and includes single crystal silicon, doped single crystal silicon, polycrystalline silicon, doped polycrystalline silicon, porous silicon, silicon oxide, quartz, silica, silicon nitride or silicon carbide;

said at least one second material is ceramic-based and includes photostructurable glass, borosilicate, aluminosilicate, quartz glass, zerodur, single crystal corundum, polycrystalline corundum, alumina, aluminium oxide, aluminium nitride, single crystal ruby, polycrystalline ruby, zirconium oxide, titanium oxide, titanium nitride, titanium carbide, tungsten nitride, tungsten carbide, boron nitride or boron carbide said at least one second material is metal-based and includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof;

said at least one second material further includes at least a partial coating of silicon oxide, silicon nitride, silicon carbide or an allotrope of carbon;

the first part and/or the second part is a balance spring, an impulse pin, a balance, an arbor, a roller, a pallet lever such as a pallet-staff, lever, fork, pallet-stone and a guard-pin, a wheel set such as a wheel, an arbor and a pinion, a bridge, a plate, an oscillating weight, a winding stem, a bearing, a jewel hole, a contrate toothing or a column-wheel.

The invention relates to a timepiece, characterized in that it includes a timepiece movement according to any of the preceding variants.

Further, according to a first embodiment, the invention relates to a method for manufacturing a one-piece timepiece component including the following steps:

a) taking a first wafer based on photostructurable glass including a first etched pattern;

b) taking at least a second wafer made of at least a second material including at least a second etched pattern;

c) joining or bonding the first wafer with said at least one second wafer to form a substrate and, by superposition of said patterns, forming a one-piece timepiece component including a first thickness based on photostructurable glass and at least one second thickness of said at least one second material;

d) releasing the one-piece timepiece component from the substrate.

According to a second embodiment, the invention relates to a method for manufacturing a one-piece timepiece component including the following steps:

e) joining or bonding a first wafer based on photostructurable glass with at least a second wafer made of at least a second material to form a substrate;

f) etching a pattern in each of the wafers of the substrate and, by superposition of said patterns, forming a one-piece timepiece component including a first thickness based on photostructurable glass and at least one second thickness of said at least one second material;

g) releasing the one-piece timepiece component from the substrate.

Finally, regardless of the embodiment, several timepiece components are made on the same substrate for the mass production thereof.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
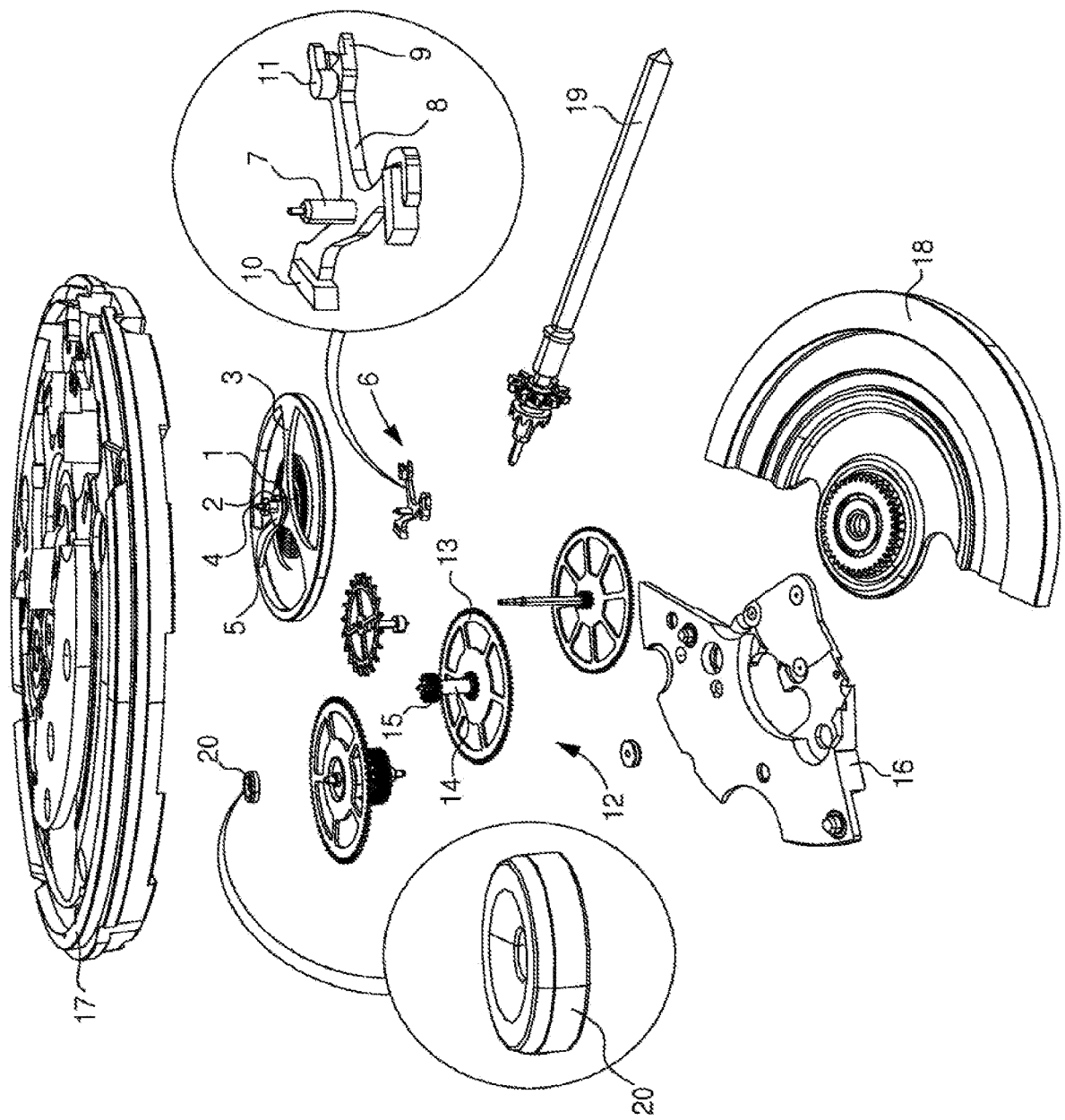
FIGS. 1 to 4 are perspective diagrams of timepiece components according to the invention.

As explained above, the invention relates to a component formed with the aid of a first part based on photostructurable glass with a second part including the same type of material or another type of material, i.e. based on silicon, metal or ceramic.

This component was devised for applications in the field of horology and is made necessary by the structuration limitations of fragile materials such as silicon or ceramic based materials. By way of example, it is possible to envisage forming the balance spring, balance, pallets, bridges, oscillating weights or even wheel sets, such as the escape wheels, completely or partially based on fragile materials.

Hence the invention relates to a timepiece component including a first part based on photostructurable glass, at least a second part based on at least a second material, characterized in that one surface of the first part is made integral with a surface of the second part so as to form a one-piece timepiece component.

Advantageously according to the invention, it is understood that the first part will have greater possibilities in regard to shape while retaining a second part that utilises the advantages of its material. Further, there is a large variety of possible bonding processes for photostructurable glass. Consequently, it is not essential to use additional material to make the two parts integral as is the case with adhesive bonding or the use of an intermediate part. Thus, for example, two surfaces of corresponding shapes are sufficient to join or bond the first part with the second part.

As explained above, the one-piece timepiece component may be completely or partially formed from a basis of photostructurable glass. Thus, said at least one second material may be based on silicon, metal or ceramic. Further, said at least one second material may also optionally include an intermediate material intended to promote the bonding of two materials that are difficult to attach. Thus, depending on the bonding technique selected, this intermediate material may be likened to a braze intended to attach two materials to each other by joint adherence to the intermediate material, or, conversely, form a layer intended to produce sufficiently intense heat to cause the two materials to melt.

When said at least one second material is silicon-based, it may include single crystal silicon, doped single crystal silicon, polycrystalline silicon, doped polycrystalline silicon, porous silicon, silicon oxide, quartz, silica, silicon nitride or silicon carbide.

When said at least one second material is ceramic-based, it may include photostructurable glass, borosilicate, aluminosilicate, quartz glass, zerodur, single crystal corundum, polycrystalline corundum, alumina, aluminium oxide, aluminium nitride, single crystal ruby, polycrystalline ruby, zirconium oxide, titanium oxide, titanium nitride, titanium carbide, tungsten nitride, tungsten carbide, boron nitride or boron carbide.

When said at least one second material is metal-based, it may include an iron alloy like 15P, 20AP or 316L steels, a copper alloy such as brass, a nickel alloy such as nickel silver, titanium or an alloy thereof, gold or an alloy thereof, silver or an alloy thereof, platinum or an alloy thereof, ruthenium or an alloy thereof, rhodium or an alloy thereof, or palladium or an alloy thereof.

Further, said at least one second material, even based on silicon, metal or ceramic, may include at least a partial coating of silicon oxide, silicon nitride, silicon carbide or an allotrope of carbon.

Advantageously according to the invention, the first part and/or the second part may form a large variety of timepiece components for a timepiece. By way of non-limiting example and with reference to FIG. 1, the first part and/or the second part may thus notably form a balance spring 1, an impulse pin 2, a balance 3, a staff 4, a roller 5, a pallets 6 such as a pallet-staff 7, a pallet lever 8, a fork 9, a pallet stone 10 and a guard-pin 11, a wheel set 12 such as a wheel 13, an arbor 14 and a pinion 15, a bridge 16, a plate 17, an oscillating weight 18, a winding stem 19 or a bearing 20.

Figure 2:
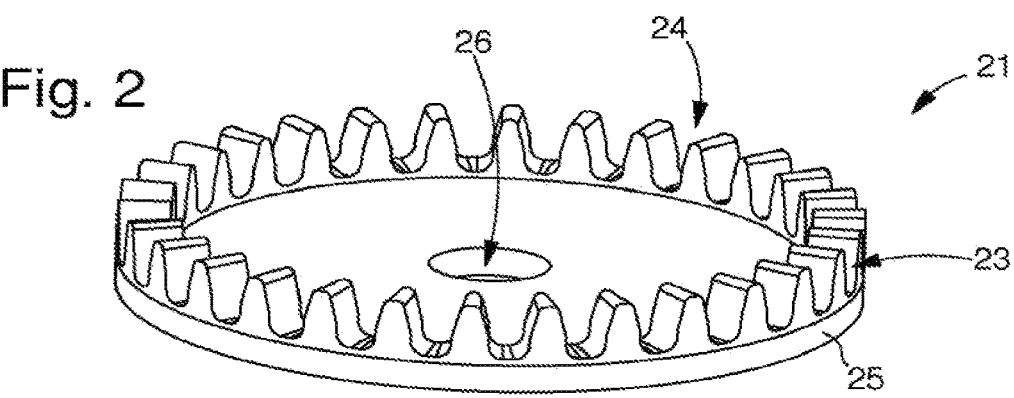

By way of example, FIG. 2 shows a timepiece component forming a wheel set 21. Wheel set 21 includes a first part 23 based on photostructurable glass forming a contrate toothing 24 made integral with a second annular part 25 based on silicon, metal or ceramic and including a hole 26.

Figure 3:
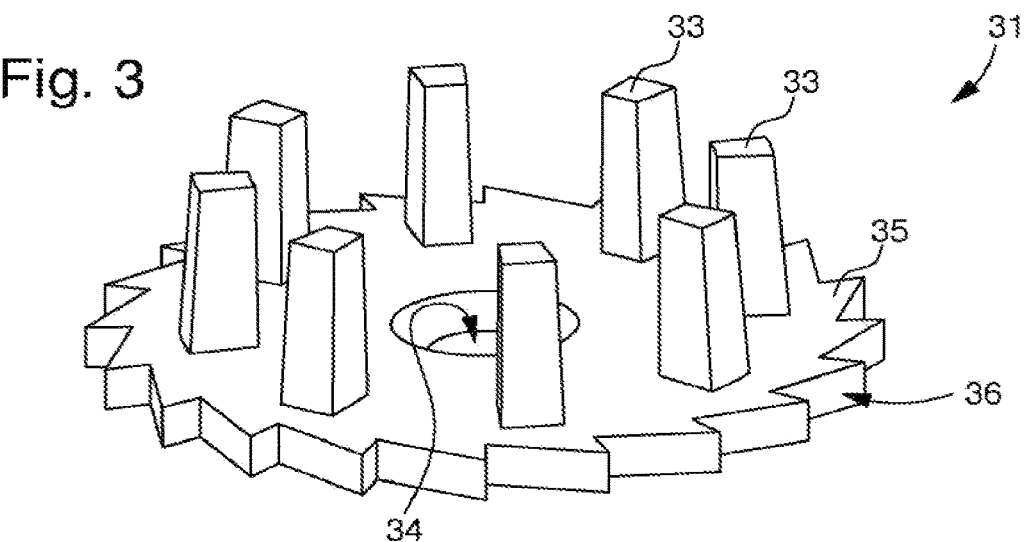

FIG. 3 shows another example of a timepiece component forming a column-wheel 31. Column-wheel 31 includes several first parts 33 based on photostructurable glass forming the asymmetrical columns made integral with a second annular part 35 based on silicon, metal or ceramic including a central hole 34 and a peripheral toothing 36.

Figure 4:
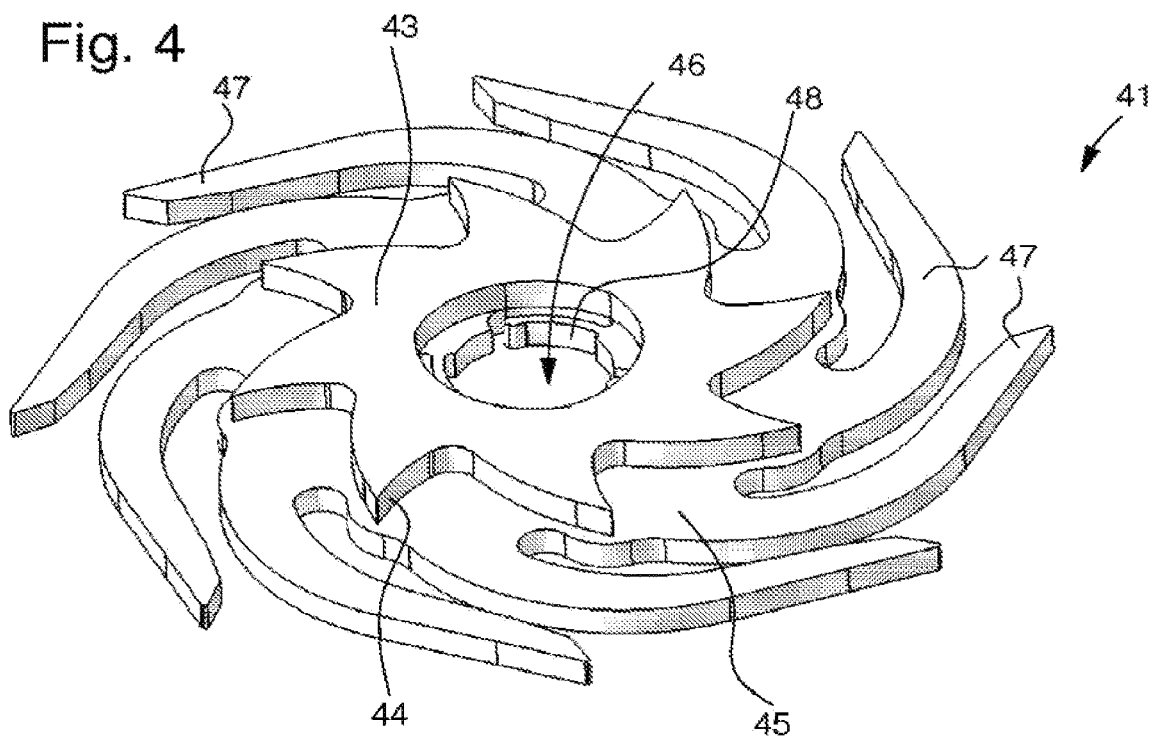

FIG. 4 shows a last example of a timepiece component forming a double wheel 41. Double wheel 41 includes a first part 43 based on photostructurable glass forming a toothing 44 made integral with a second annular part 45 based on silicon, metal or ceramic including a central hole 46 provided with elastic means 48 and arms 47 forming a peripheral toothing.

As explained above, the first part and/or the second part may form a variety of timepiece components. By way of additional example in FIGS. 2 to 4, a pallets 6 could be formed from a first part based on photostructurable glass forming lever 8, pallet stones 10 and fork 9 and of a second part forming the staff and/or guard-pin 11.

Moreover, a first part based on photostructurable glass could form a roller 5 and be integral with a second part forming an impulse pin 2, a first part based on photostructurable glass could form a plate 17 or a bridge 16 and be integral with several second parts forming jewel holes 20 or a first part based on photostructurable glass could form an oscillating weight 18 and be made integral with a second part forming an additional weight on the peripheral portion.

According to a first preferred embodiment, the invention relates to a manufacturing method including a first step a) intended to provide a first wafer 51 based on photostructurable glass including a first etched pattern 53. Such glasses are, for example, available from Schott A.G. under the reference Foturan®, from Hoya Corp under the reference PEG3® or from LifeBioScience Inc. under the reference Apex™.

Advantageously according to the invention, photostructuration of a photostructurable glass allows for a greater variety of shape than etching of silicon or ceramic based materials. The photostructuration process consists, in a first phase, of illumination at a wavelength corresponding to photostructurable glass through a mask that is partially opaque to said wavelength. Areas of the photostructurable glass wafer are structured according to the quantity, orientation and distribution of illumination.

It is thus understood that by using a mask with areas of variable opacity and/or a source with controllable focus, it is possible to create shapes such as the aforementioned contrate toothing 24 or asymmetrical column 33. The illumination source may for example by a UV lamp with a spectral distribution peak at a wavelength comprised between 200 and 400 nm.

Figure 5:
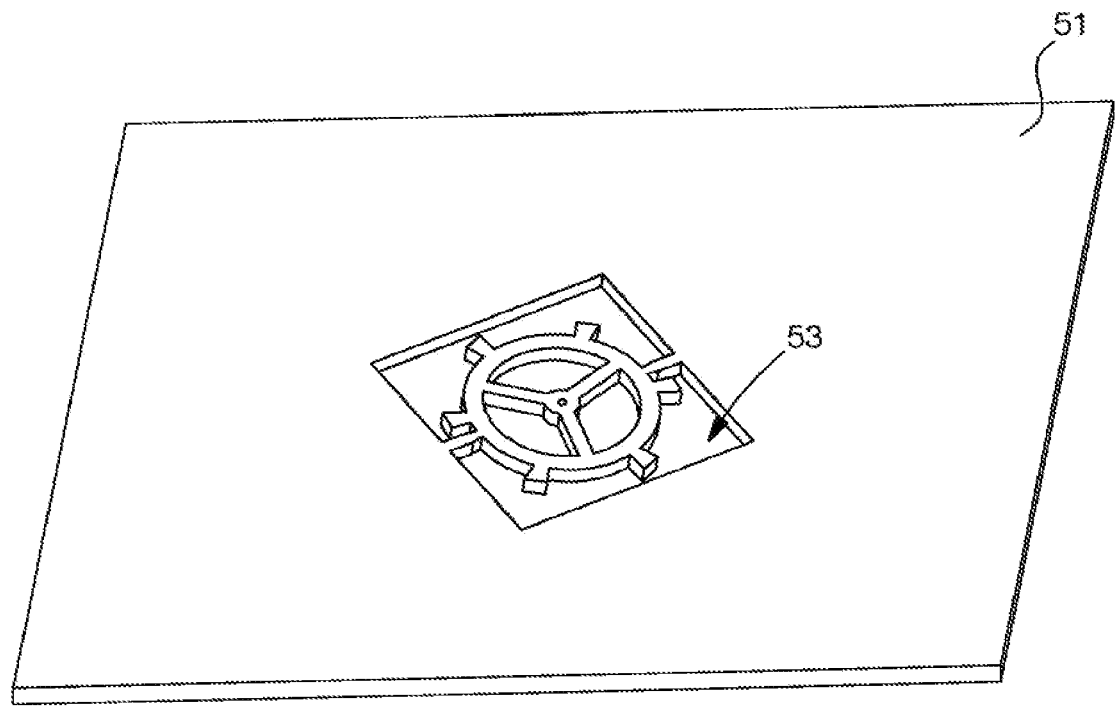
FIGS. 5 to 7 are views of steps of a method for manufacturing a timepiece component according to the invention.
Figure 6:
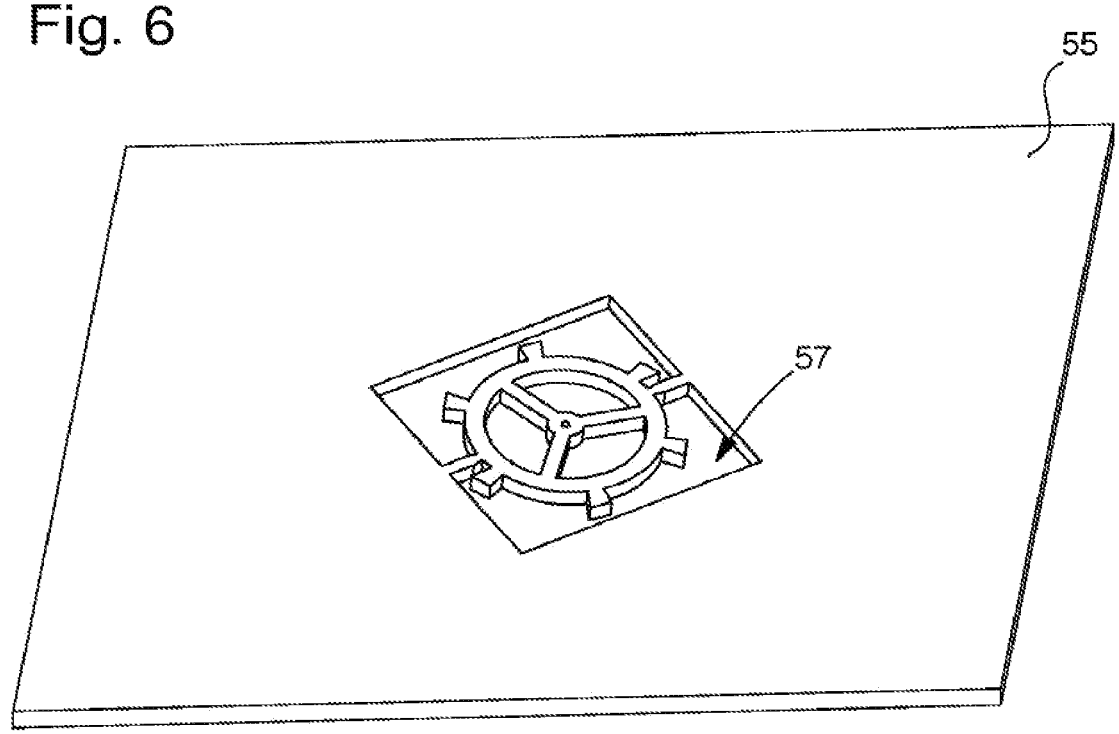

A second phase consists in subjecting the photostructurable glass wafer to a heat treatment. The heating temperature varies according to the photostructurable glass and may be up to approximately 600° C. This heat treatment makes more selective illuminated areas for the last elimination phase by a chemical etching. This chemical etching may be performed, for example, in a 10% hydrofluoric acid bath, at ambient temperature and using ultrasounds. A wafer 51 as shown in FIG. 5 is thus obtained.

A second step b) is intended to provide at least a second wafer 55 made of at least a second material including at least a second etched pattern 57. In a non-limiting manner, a dry etching such as a deep reactive ionic etching (DRIE), laser etching or a plasma etching may be mentioned. It is also perfectly possible to envisage using a wet etching, such as a chemical etching or even another photostructuration, as explained above. Finally, it is also possible to perform photostructuration mixing photolithography of a resin followed by a dry etching or wet etching.

A third step c) is intended to join or bond first wafer 51 with said at least one second wafer 55 to form a substrate and, by superposition of said patterns 53, 55, to form a one-piece timepiece component including a first thickness based on photostructurable glass and at least a second thickness of said at least one second material based on silicon, metal or ceramic.

Depending on the materials used, there are several possible bonding methods. In a non-limiting manner, one may mention the direct welding of surfaces by electromagnetic radiation using a laser, as, for example, explained in EP Patent No 1436830, which is incorporated by reference in this description. It is also perfectly possible to envisage using anodic bonding, fusion bonding, thermocompression bonding, reflow bonding, eutectic bonding, ultrasonic bonding or thermosonic bonding.

Finally, the method includes a final step d) intended to release the one-piece timepiece component from the substrate. Advantageously according to the invention, a large variety of materials can thus be used to form the timepiece components in an industrial manner. As illustrated in FIG. 4, it is possible, for example, to obtain a wheel set 41 including a first thickness 43 based on photostructurable glass, and at least a second thickness 45 of said at least second material.

According to an alternative of the first embodiment, step b) may consist in forming several second wafers formed from the same material or from several different materials. In this alternative of the first embodiment, it is therefore understood that in step c) it is possible to obtain a substrate with three bonded wafers thus forming a timepiece component including a first thickness based on photostructurable glass and at least two second thicknesses formed from the same material or from several different materials.

According to a second embodiment, the invention relates to a manufacturing method including a first step e) intended to join or bond a first photostructurable glass based wafer with at least a second wafer made of at least a second material to form a substrate with the aid of the same methods described in step c) of the first embodiment.

The second embodiment continues with step f), intended to etch a pattern in each of the wafers of the substrate and, by superposition of said patterns, to form a one-piece timepiece component including a first thickness based on photostructurable glass and at least one second thickness of said at least one second material with the aid of the same methods described in steps a) and b) of the first embodiment.

Finally, the method includes a final step g) intended to release the one-piece timepiece component from the substrate. Advantageously according to the invention, a large variety of materials can thus be used to form timepiece components in an industrial manner. As illustrated in FIG. 4, it is possible, for example, to obtain a wheel set 41 including a first thickness 43 based on photostructurable glass, and at least a second thickness 45 of said at least second material.

According to an alternative of the second embodiment, similar to that of the first embodiment, step e) may also consist in making a substrate with the aid of several second wafers formed from the same material or from several different materials. In this alternative of the second embodiment, it is therefore understood that it is possible to obtain a substrate with three bonded wafers thus forming a timepiece component including a first thickness based on photostructurable glass and at least two second thicknesses formed from the same material or from several different materials.

Figure 7:
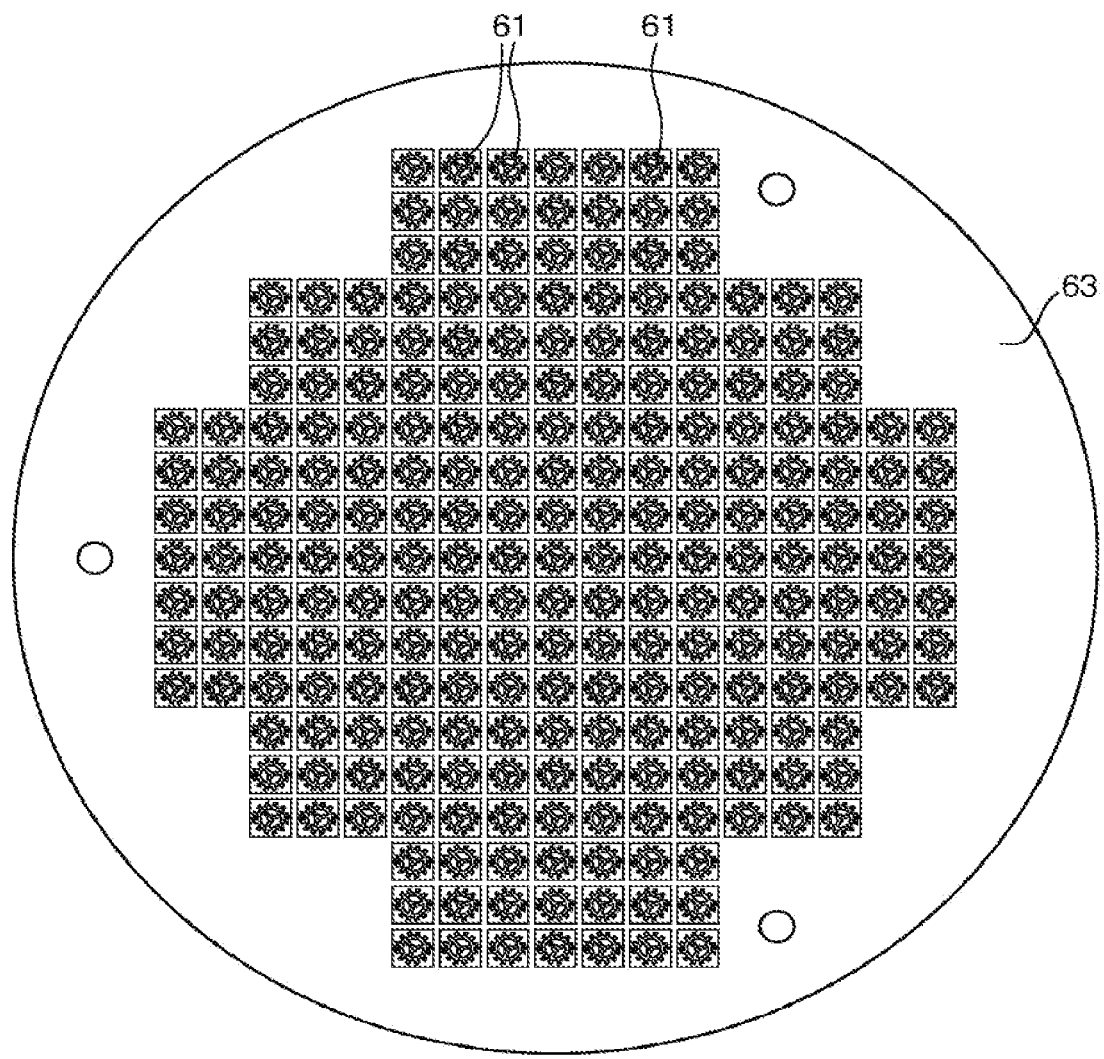

Of course, regardless of the embodiment, the method permits several timepiece components 61 to be manufactured on the same substrate 63 as illustrated in FIG. 7.

The present invention is not limited to the illustrated example but is capable of various variants and modifications which will be clear to those skilled in the art. In particular, if the same pattern is required for each part, the wafers may be bonded to each other and then a single etching may be provided.

Likewise, as in the example of the multiple columns 33 of column-wheel 31, the method using wafers is preferred, i.e. all of columns 33 are structured in the same photostructurable glass wafer and bonded to another wafer. However, there is nothing to prevent columns 33 being detached one-by-one and then gradually made integral with another finished part, such as a toothed wheel 35.

The invention claimed is:

1. A substrate comprising:
a first wafer based on photostructurable glass, the first wafer having a first thickness and including a planar body with a plurality of first parts that are identically shaped and identically oriented in an interior of the planar body of the first wafer, the first parts formed by etching the first wafer and the first parts are connected to the first wafer by bridges after the etching; and
a second wafer based on at least one second material, the second wafer having a second thickness and including a planar body with a plurality of second parts that are identically shaped and identically oriented in an interior of the planar body of the second wafer, the second parts formed by etching the second wafer and the second parts are connected to the second wafer by bridges after the etching,
wherein the first wafer with the etched first parts and the second wafer with the etched second parts are joined, after the etching of the first wafer and the etching of the second wafer is completed, to adjoin only along a single surface,
wherein, once the first wafer and the second wafer are joined, one surface of each of the first parts is made integral with a first surface of each of the second parts thereby forming a plurality of the one-piece timepiece components attached to the first wafer and the second wafer, and
wherein the first parts are each a contrate toothing and the second parts are each an annular part including a central hole.

2. The substrate according to claim 1, wherein the at least one second material is silicon-based and includes single crystal silicon, doped single crystal silicon, polycrystalline silicon, doped polycrystalline silicon, porous silicon, silicon oxide, quartz, silica, silicon nitride or silicon carbide.

3. The substrate according to claim 1, wherein the at least one second material is ceramic-based and includes photostructurable glass, borosilicate, aluminosilicate, quartz glass, zerodur, single crystal corundum, polycrystalline corundum, alumina, aluminium oxide, aluminium nitride, single crystal ruby, polycrystalline ruby, zirconium oxide, titanium oxide, titanium nitride, titanium carbide, tungsten nitride, tungsten carbide, boron nitride or boron carbide.

4. The substrate according to claim 1, wherein the at least one second material is metal-based and includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

5. The substrate according to claim 1, wherein the at least one second material further includes at least a partial coating of silicon oxide, silicon nitride, silicon carbide or an allotrope of carbon.

6. The substrate according to claim 1, wherein the first parts are arranged along a straight line on the first wafer and the second parts are arranged along a straight line on the second wafer.

7. A substrate comprising:
a first wafer based on photostructurable glass, the first wafer having a first thickness and including a planar body with a plurality of first parts that are identically shaped in an interior of the planar body of the first wafer, the first parts formed by etching the first wafer and the first parts are connected to the first wafer by bridges after the etching; and
a second wafer based on at least one second material, the second wafer having a second thickness and including a planar body with a plurality of second parts that are identically shaped in an interior of the planar body of the second wafer, the second parts formed by etching the second wafer and the second parts are connected to the second wafer by bridges after the etching,
wherein the first wafer with the etched first parts and the second wafer with the etched second parts are joined, after the etching of the first wafer and the etching of the second wafer is completed, to adjoin only along a single surface,
wherein, once the first wafer and the second wafer are joined, one surface of the first part is made integral with a surface of the second part thereby forming a one-piece timepiece component attached to the first wafer and the second wafer,
wherein the one-piece timepiece component is permanently releasable from the substrate, and
wherein the first parts are each asymmetrical columns and the second parts are each an annular part including a central hole and peripheral toothing.

8. The substrate according to claim 7, wherein the at least one second material is silicon-based and includes single crystal silicon, doped single crystal silicon, polycrystalline silicon, doped polycrystalline silicon, porous silicon, silicon oxide, quartz, silica, silicon nitride or silicon carbide.

9. The substrate according to claim 7, wherein the at least one second material is ceramic-based and includes photostructurable glass, borosilicate, aluminosilicate, quartz glass, zerodur, single crystal corundum, polycrystalline corundum, alumina, aluminium oxide, aluminium nitride, single crystal ruby, polycrystalline ruby, zirconium oxide, titanium oxide, titanium nitride, titanium carbide, tungsten nitride, tungsten carbide, boron nitride or boron carbide.

10. The substrate according to claim 7, wherein the at least one second material is metal-based and includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

11. The substrate according to claim 7, wherein the at least one second material further includes at least a partial coating of silicon oxide, silicon nitride, silicon carbide or an allotrope of carbon.

12. The substrate according to claim 7, wherein the first parts are arranged along a straight line on the first wafer and the second parts are arranged along a straight line on the second wafer.

13. A substrate comprising:
a first wafer based on photostructurable glass, the first wafer having a first thickness and including a planar body with a first part in an interior of the planar body of the first wafer, the first part being formed by etching the first wafer, the first part connected to the first wafer by at least one bridge after the etching; and
a second wafer based on at least one second material, the second wafer having a second thickness and including a planar body with a second part in an interior of the planar body of the second wafer, the second part being formed by etching the second wafer, the second part connected to the second wafer by at least one bridge after the etching,
wherein the first wafer and the second wafer are joined, after the etching of the first wafer and the etching of the second wafer is completed, to adjoin only along a single surface,
wherein one surface of the first part is made integral with a first surface of the second part thereby forming a one-piece timepiece component, and
wherein the first parts are each a contrate toothing and the second parts are each an annular part including a central hole.

14. The substrate according to claim 13, wherein the at least one second material is silicon-based and includes single crystal silicon, doped single crystal silicon, polycrystalline silicon, doped polycrystalline silicon, porous silicon, silicon oxide, quartz, silica, silicon nitride or silicon carbide.

15. The substrate according to claim 13, wherein the at least one second material is ceramic-based and includes photostructurable glass, borosilicate, aluminosilicate, quartz glass, zerodur, single crystal corundum, polycrystalline corundum, alumina, aluminium oxide, aluminium nitride, single crystal ruby, polycrystalline ruby, zirconium oxide, titanium oxide, titanium nitride, titanium carbide, tungsten nitride, tungsten carbide, boron nitride or boron carbide.

16. The substrate according to claim 13, wherein the at least one second material is metal-based and includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

17. The substrate according to claim 13, wherein the at least one second material further includes at least a partial coating of silicon oxide, silicon nitride, silicon carbide or an allotrope of carbon.

18. The substrate according to claim 13, wherein the first parts are arranged along a straight line on the first wafer and the second parts are arranged along a straight line on the second wafer.

19. A substrate comprising:
a first wafer based on photostructurable glass, the first wafer having a first thickness and including a planar body with a plurality of first parts that are identically shaped and identically oriented in an interior of the planar body of the first wafer, the first parts formed by etching the first wafer and the first parts are connected to the first wafer by bridges after the etching; and a second wafer based on at least one second material, the second wafer having a second thickness and including a planar body with a plurality of second parts that are identically shaped and identically oriented in an interior of the planar body of the second wafer, the second parts formed by etching the second wafer and the second parts are connected to the second wafer by bridges after the etching, wherein the first wafer with the etched first parts and the second wafer with the etched second parts are joined, after the etching of the first wafer and the etching of the second wafer is completed, to adjoin only along a single surface, wherein, once the first wafer and the second wafer are joined, one surface of each of the first parts is made integral with a first surface of each of the second parts thereby forming a plurality of the one-piece timepiece components attached to the first wafer and the second wafer, and wherein the first parts are each asymmetrical columns and the second parts are each an annular part including a central hole and peripheral toothing.

20. A substrate comprising:

a first wafer based on photostructurable glass, the first wafer having a first thickness and including a planar body with a plurality of first parts that are identically shaped in an interior of the planar body of the first wafer, the first parts formed by etching the first wafer and the first parts are connected to the first wafer by bridges after the etching; and a second wafer based on at least one second material, the second wafer having a second thickness and including a planar body with a plurality of second parts that are identically shaped in an interior of the planar body of the second wafer, the second parts formed by etching the second wafer and the second parts are connected to the second wafer by bridges after the etching, wherein the first wafer with the etched first parts and the second wafer with the etched second parts are joined, after the etching of the first wafer and the etching of the second wafer is completed, to adjoin only along a single surface, wherein, once the first wafer and the second wafer are joined, one surface of the first part is made integral with a surface of the second part thereby forming a one-piece timepiece component attached to the first wafer and the second wafer, wherein the one-piece timepiece component is permanently releasable from the substrate, and wherein the first parts are each a contrate toothing and the second parts are each an annular part including a central hole.

21. A substrate comprising:

a first wafer based on photostructurable glass, the first wafer having a first thickness and including a planar body with a first part in an interior of the planar body of the first wafer, the first part being formed by etching the first wafer, the first part connected to the first wafer by at least one bridge after the etching; and a second wafer based on at least one second material, the second wafer having a second thickness and including a planar body with a second part in an interior of the planar body of the second wafer, the second part being formed by etching the second wafer, the second part connected to the second wafer by at least one bridge after the etching, wherein the first wafer and the second wafer are joined, after the etching of the first wafer and the etching of the second wafer is completed, to adjoin only along a single surface, wherein one surface of the first part is made integral with a first surface of the second part thereby forming a one-piece timepiece component, and wherein the first parts are each asymmetrical columns and the second parts are each an annular part including a central hole and peripheral toothing.

* * * * *